United States Patent
Berner

(10) Patent No.: US 6,313,862 B1
(45) Date of Patent: Nov. 6, 2001

(54) METHOD FOR TRANSFERRING DATA AND USE THEREOF

(75) Inventor: Peter Berner, Rupperswil (CH)

(73) Assignees: Ursula Lüscher, Meisterschwanden; Hans Lüscher, Lenzburg, both of (CH)

( * ) Notice: Subject to any disclaimer, the term of this patent is extended or adjusted under 35 U.S.C. 154(b) by 0 days.

(21) Appl. No.: 09/423,752

(22) PCT Filed: Mar. 23, 1998

(86) PCT No.: PCT/CH98/00114

§ 371 Date: Nov. 15, 1999

§ 102(e) Date: Nov. 15, 1999

(87) PCT Pub. No.: WO98/52345

PCT Pub. Date: Nov. 19, 1998

(30) Foreign Application Priority Data

May 14, 1997 (CH) .................................................. 1132/97

(51) Int. Cl.$^7$ .............................. B41J 2/455; G01D 15/16
(52) U.S. Cl. ........................... 347/233; 347/238; 346/125
(58) Field of Search .................................. 347/238, 233, 347/236, 237, 247, 240; 346/103, 125, 138; 360/81, 87, 100.1, 136; 101/467

(56) References Cited

U.S. PATENT DOCUMENTS

| | | | |
|---|---|---|---|
| 3,995,316 | * 11/1976 | Kihara | 360/81 |
| 4,479,133 | 10/1984 | Shiozawa et al. | 347/242 |
| 5,655,452 | 8/1997 | Blake et al. | 101/477 |
| 5,699,103 | * 12/1997 | Fleming | 347/240 |
| 5,738,014 | 4/1998 | Rombult et al. | 101/477 |
| 5,788,455 | 8/1998 | Krupica et al. | 414/797 |
| 5,791,250 | 8/1998 | Blake et al. | 101/483 |
| 5,809,360 | 9/1998 | Blake et al. | 396/517 |
| 5,819,661 | * 10/1998 | Lewis et al. | 101/467 |
| 5,874,984 | * 2/1999 | Scholz et al. | 347/238 |
| 5,992,324 | 11/1999 | Rombult et al. | 101/477 |
| 6,000,337 | 12/1999 | Blake et al. | 101/477 |
| 6,084,602 | 7/2000 | Rombult et al. | 346/134 |
| 6,113,346 | 9/2000 | Blake et al. | 414/811 |

FOREIGN PATENT DOCUMENTS 0 590 907  4/1994 (EP) .
2 073 986  10/1981 (GB) .

* cited by examiner

*Primary Examiner*—Hai C. Pham
(74) *Attorney, Agent, or Firm*—Venable; Norman N. Kunitz

(57) ABSTRACT

A system (21) is proposed for transferring data to plate-like data carriers (23, 23'), the system comprising a holder (22, 22'), shaped at least partly as an inner cylinder, to arrange the data carriers (23, 23')—of which the side provided to accept data faces the cylinder axis (29) of the holder (30)—and a transfer head (30) which can rotate about this cylinder axis and has at least one transfer means (24)—for transferring the data to the data carrier (23, 23') the holder (22, 22') and the transfer head also being capable of moving relative to each other in the direction of the cylinder axis (29) and the distance between at least one surface of the transfer head (30) or transfer means (24) and the data carrier—during the transfer of data—preferably being less than ¼ of the holder diameter and particularly preferably less than 1 cm. The system (21) is characterized in that the transfer means (24) comprises an array of 24 to 256 light sources for transferring the data using a multi-beam technique; according to a first embodiment, the transfer head is arranged both such that it can move in the direction of the cylinder axis of the holder and can rotate about the cylinder axis of the holder, and the transfer means (24) comprise a large number or an array of laser diodes, with which the data can be transferred to a thermal printing plate (23, 23') using a multi-beam technique.

12 Claims, 1 Drawing Sheet

TRANSFER HEAD WITH SEMICONDUCTOR LASER ARRAY AND ASSOCIATED ELECTRICAL POWER AND OPTICAL IMAGING DEVICES

METHOD FOR TRANSFERRING DATA AND USE THEREOF

BACKGROUND OF THE INVENTION

The invention relates to a system for transferring data and to the use of this system, especially to setting images on thermal printing plates.

In printing technology, especially in offset printing technology, a distinction is in principle drawn between the analogue and the digital setting of printing plate images:

The data contained on a negative or positive film, such as images, text or graphics, are transferred to a light-sensitive printing plate—in an analogue manner—in a copying room or a repetition copying machine by means of an ultraviolet light source. The property of the light-sensitive layer on the printing plate is matched to the light source, so that it has a sensitivity maximum at 380 nm, for example.

The image area of a printing plate is written directly by one or more lasers—in a digital manner. The sensitivity of the printing plate has its maximum corresponding to the light source. Depending on the wavelength of the light used, one speaks of laser plates in the case of visible light and of thermal plates in the case of infrared light at, for example, 830 nm.

Nowadays, thermal plates have a particularly promising future. These pre-coated, anodized aluminum plates can have images set both by analogue and by digital means. The maximum sensitivity of the plates, for example at 830 nm, is selected such that normal daylight does not have a disruptive effect t during "image-setting". Above this value, the sensitivity of the thermal plates drops off abruptly, so that, for example at a wavelength of 880 nm, only about 10–15% of the sensitivity measured at 800 nm is still achieved. Experience shows that an energy requirement of 170 mJ/cm$^2$ is needed to set an image on such thermal plates. The use of thermal plates renders superfluous complicated and therefore expensive handling systems which permit light-sensitive plates to have images set under dark-room conditions. In spite of their ability to be handled simply, thermal plates, thanks to the infrared or thermal technology which can be used, ensure high reliability. In the meantime, there are thermal plates on the market which, on the one hand, permit conventional positive processing with aqueous development and which, on the other hand, can be used in the printing machine like conventional coated printing plates. In addition, with the increasing digitization of the printing trade, the requirement for the digital image-setting of printing plates is growing.

In order to transfer data, such as images, texts or graphics, to data carriers, such as offset printing plates, essentially three image-setting principles are known.

The flat bed, as the simplest system for the analogue image-setting of printing plates, is suitable only to a certain extent for the digital image-setting of the same. On the one hand, the outlay for guiding an image-setting head increases with the size of the printing plate, on the other hand there is always a part of the possible travel of the image-setting system which is unused, as a result of the demanded image-setting speed and because of the necessary starting and braking ramps of the image-setting head.

An internal-drum image setter (see FIG. 1) which is known per se has the following advantages: the plate size can be selected independently, since the plate does not move during image-setting. The plates can be simply laid in fitting holes provided. An automatic system for leading the plates to and from can be provided relatively simply. The disadvantages of such an internal-drum image setter have to be listed: it is necessary to operate with a particularly powerful, frequency-doubled YAG laser, a single laser beam being caused to rotate over the plate from the centre of the drum. This makes focusing more difficult, because of the great distance, and does not permit image-setting using multiple beans. Use is often made of a polygon mirror, which is rotated at up to 30,000 rev/min. This requires a complicated mounting. In addition, vibrations—be they in the environment of the device or within the system—have an extreme effect on the achievable resolution.

In an external-drum image setter (see FIG. 2) which is likewise known, the image-setting head can be brought up to a few millimetres from the plate, which permits the use of significantly weaker and cheaper laser diodes. The latter can be more easily focused and added as multiple heads, devices having alternatively 256 or 512 laser diodes arranged alongside one another being known. These advantages are opposed by the following disadvantages: secure fixing of the plate on the drum is very complicated in design terms. Undesired detachment of the plate during the image-setting cannot be ruled out. However, should this occur, considerable damage to the machine, especially to the image-setting head, must be expected. The rotational speed of the drum is limited to about 100 rev/min, which means that an enlargement of the area on which the image is to be set affects the image-setting time to a considerable extent. Various plate formats result in a different distribution of weight on the drum, which, in routine operation, results in the necessity for automatic balancing. Inserting the plates securely into the register pins is very complicated, which virtually requires the automation of this process, on the one hand, but makes it considerably more difficult, on the other hand.

EP 0 590 907 discloses a rotating drum for a scanner or plotter. This is an internal-drum image setter, in which the drum rotates rather than the light source. The light source is fixed to a long arm, which reaches over the entire length of the drum and penetrates into the latter, so that image-setting over the entire area of substrates fixed to the inside of the drum is made possible. The long, linearly movable arm can pick up oscillations in the system and, as a result, begin to oscillate itself. Such a behavior of the arm can have a detrimental effect on the resolution of the image.

U.S. Pat. No. 4,479,133 discloses a light beam rotary printer having a light beam projection system which comprises a number of light sources each having a condenser lens. These light sources are fixed to a rotating wheel and radiate outwards in the radial direction while the wheel is rotated. In order to be able to produce uniform image-setting with this internal-drum image setter, the individual light sources have to be adjusted finely in the range of 12 μm. This extremely delicate setting operation means additional working outlay and necessitates the use of specially trained personnel; both can have the effect of making the products more expensive or—if too little attention is paid to this point—can have a detrimental effect on the resolution of the image.

The object of the present invention is to propose an image-setting system which, on the one hand, combines many of the individual advantages of the known internal-drum and external-drum image setters and, in addition, eliminates a considerable number of the disadvantages of these systems.

SUMMARY OF THE INVENTION

According to the invention, the above object is achieved according to the present invention by a system which, in order to transfer data to plate-like data carriers, comprises a holder, shaped at least partly as an inner cylinder, to arrange the data carriers—of which the side provided to accept data faces the cylinder axis of the holder—and a transfer head which can rotate about this cylinder axis and has at least one transfer means—for transferring the data to the data carrier—the holder and the transfer head also being capable of moving relative to each other in the direction of the cylinder axis and the distance between at least one surface of the transfer head or transfer means and the data carrier—during the transfer of data—being less than ¼ of the holder diameter. The system is characterized in that the transfer means comprises an array of 24 to 256 light sources for transferring the data using a multi-beam technique. Furthermore, a use of this system is proposed in which the data can be transferred to a thermal printing plate using a multi-beam technique. The preferred developments of this system and the preferred applications of the same in each case emerge from the dependent claims.

The device according to the invention will be discussed below with reference to schematic drawings. The latter constitute only a preferred embodiment of the invention and are in no way intended to restrict the scope of this invention.

DESCRIPTION OF THE PREFERRED EMBODIMENTS

Figure 1:
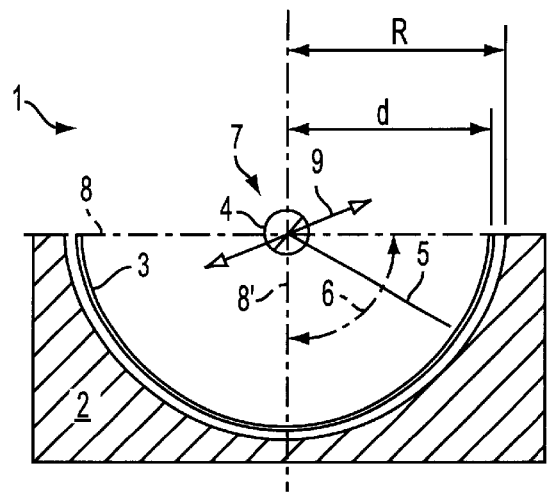
FIG. 1 shows a cross section through an internal-drum image-setting system (prior art).

FIG. 1 shows an internal-drum image-setting system 1 known per se and having a holder 2 of at least partial cylindrical form. Inserted into this holder is a printing plate 3, preferably a thermal printing plate. By means of a rotating transfer means 4, a prism, a light beam 5 is sent onto the surface of the printing plate 3. The prism 4 can be rotated in the direction 6 about the cylinder axis 7, which extends through the section line of the planes of symmetry 8 and 8', respectively. As a result, it is possible for example for the entire width of the printing plate 3 to be swept over by the light beam or laser beam 5. In order that the greatest possible area of the plate 3 can be struck by the laser beam 5, the prism in this example is moved along the cylinder axis 7 in the direction 9. The plate 3 can be fixed in the holder 2 by means of vacuum, for example, so that the plate likewise assumes an essentially cylindrical or partially cylindrical shape. This means that that side of the plate 3 to which data are to be transferred is spaced at a virtually constant value d from the centre of rotation of the prism 4 and, respectively, from the cylinder axis 7. Corresponding to the relatively low thickness of the plate 3, the image-setting distance d is virtually equal to the radius R of the cylindrical holder 2 and, respectively, the internal drum.

Figure 2:
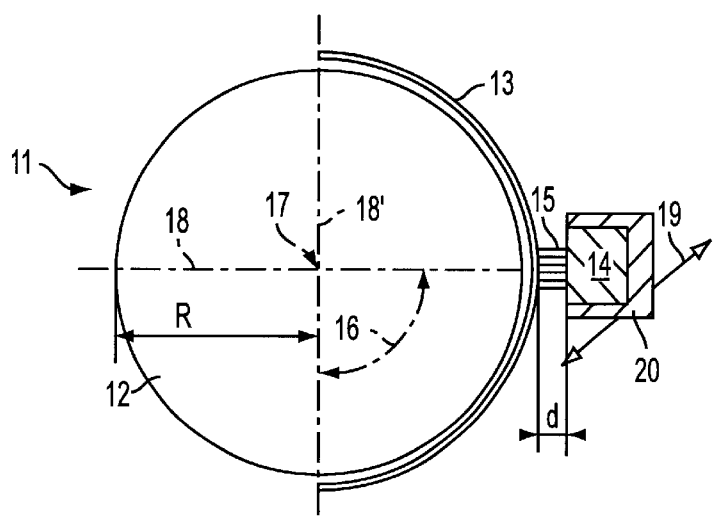
FIG. 2 shows a cross section through an external-drum image-setting system (prior art).

FIG. 2 showing an external-drum image-setting system 11, known per se, having a holder 12 in at least partial cylindrical form. Laid on this holder is a printing plate 13, preferably a thermal printing plate. By means of transfer means 14, which comprise laser diodes and which are fixed to a transfer head 20, light beams 15 are sent onto the surface of the printing plate 13. The transfer head 20 can be moved in the direction 17 along the cylinder axis 19, which extends through the section line of the planes of symmetry 18 and 18', respectively. As a result, for example, the entire length of the printing plate 3 can be swept over by the light beams or laser beams 15. In order that the greatest possible area of the plate 13 can be struck by the laser beams 15, the holder or the external drum 12 in this example can rotate about its cylinder axis 17 in the direction 19. The plate 13 can be fixed on the holder 12, for example, by means of vacuum and/or clamps, so that the plate likewise assumes an essentially cylindrical or partially cylindrical shape. This means that that side of the plate 13 to which data are to be transferred is spaced by a virtually constant value d from the surface of the transfer means 14 and, respectively, from the transfer head 20. Corresponding to the relatively large diameter of the external drum 12, the image-setting distance d is much smaller than the radius R of the cylindrical holder 12 and, respectively, the external drum.

Figure 3:
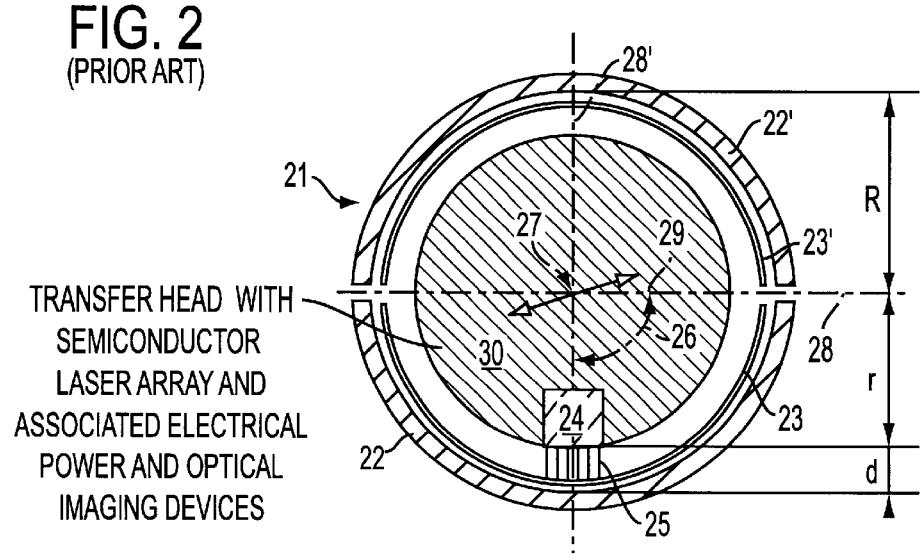
FIG. 3 shows a cross section through a first preferred embodiment of an internal-drum image-setting system according to the invention.

FIG. 3 shows, in a schematic cross-sectional illustration, a first preferred embodiment of the internal-drum image-setting system 21 according to the invention. A printing plate 23, advantageously a thermal plate, is inserted into the holder or into the drum 22. By means of a transfer means 24, which comprises laser diodes and is arranged on a transfer head 30, light beams 25 are sent onto the surface of the printing plate 23. The transfer means comprises an array, that is to say a regular arrangement, of 24 to 256 light sources. The transfer head 30 is designed as a disc and can be rotated in the direction 26 about the cylinder axis 29, which extends through the section line of the planes of symmetry 28 and 28', respectively. As a result, for example the entire width of the printing plate 23 can be swept over by the light beams or laser beams 25. The transfer head 30 can additionally be moved in the direction 29 about the cylinder axis 27, which runs through the section line of the planes of symmetry 28 and 28', respectively. As a result, for example the entire length of the printing plate 23 can also be swept over by the light beams or laser beams 25. The plate 23 can be fixed in the holder 22, for example by means of vacuum, so that the plate likewise assumes an essentially cylindrical or partially cylindrical shape. This means that that side of the plate 23 to which data are to be transferred is spaced by a virtually constant value d from at least one surface of the transfer means 24 or the transfer head 30, respectively. Corresponding to the relatively great diameter of the internal drum 22, the image-setting distance d is much smaller than the radius R of the cylindrical holder 22 or the internal drum. According to the invention, the radius r of the transfer head 30 is selected such that r>R/2. This means that the transfer head 30 is brought as close as possible to the inserted plate 23 on which an image is to be set. The image-setting distance d is preferably less than 1 cm.

The transfer head 30 is drawn in FIG. 3 as a solid device, but it is also possible to provide for one or more of the transfer means 24 to be arranged to be displaceable such that the distance r between a surface of the transfer means 24 and the cylinder axis 27 is variable. The shape of the transfer head can also differ from that of a disc, but it is always advantageous that balancing of the transfer head 30 is possible.

In a variant of this embodiment, provision may be made for the holder or the internal drum to comprise two partial shells 22 and 22'. In this way, the internal drum can be swept over to its entire extent by laser light or other media or beams used for transferring data. Particularly suitable are the half-shells 22 and 22' shown, of which one or both can also be loaded with a printing plate 23 or 23' outside the data transfer system 21. In this way, the time for loading the system can additionally be shortened. Instead of the vacuum for holding the printing plates, other methods, such as the static charging of plates 23 or 23' and/or holders 22 or 22' are also proposed.

The important factor is that during the transfer of data the transfer means 24 and the surface of the printing plate 23 on which an image is to be set can move relative to each other such that the image-setting distance d is as small as possible. Therefore, further preferred embodiments of the invention will be formulated below:

The transfer head 30 rotates about the cylinder axis 27 and the internal drum 22 can move along this cylinder axis;

The transfer head 30 can move along the cylinder axis 27 and the internal drum rotates about this cylinder axis;

The transfer head 30 is fixed and the internal drum 22 can both move along the cylinder axis 27 and also rotates about this cylinder axis; in this case the transfer head can be fixed to one side of the cylinder at any point on the transfer system 21, for example in a plane at right angles to the cylinder axis—if appropriate such that it can be displaced. The shape of such a transfer head can differ from that of a round disc, since it is not necessary to take account of balancing. Such a transfer head 30 or the transfer means 24 can also be arranged non-centrally anywhere in the interior of the cylindrical or partially cylindrical holder 22.

The capability of radial displacement of the transfer head 30 or the transfer means 24 for the purpose of adjusting the image-setting distance d is preferred in all the embodiments, so that a high resolution of the data transfer and hence excellent image quality results.

The transfer means preferred are semiconductor lasers in the form of laser diodes. Other lasers based on semiconductor technology, such as laser transistors, which can be used to form systematic distributions of light sources, so-called arrays, are of course also included by the idea of the invention.

It has proven to be particularly advantageous—in the event of laser diodes being used—for all the laser modules and all the electrical power parts associated therewith to be arranged on the transfer head 30 and such that they can rotate about the cylinder axis 29 of the holder 22, 22'. This arrangement makes it possible to supply the electrical energy for operating the laser diodes, with a high voltage and low current values, to the transfer head 30 via a slip ring and to convert it there, in the electrical power parts on the transfer head 30, into a low voltage and high current which are optimal for the laser diodes. In addition, it is particularly advantageous for the operation of the laser diodes if each laser diode is connected to a Peltier element so that it can be cooled, so that a constant operating temperature can be maintained. 24 to 256 laser diodes can be provided on the transfer head 30, and each discharge their light to a light conductor which interacts with a laser diode. In a preferred embodiment, 64 laser diodes are arranged on the transfer head. 64 glass-fibre cables acting as light conductors conduct the 64 individual signals of the 64 laser diodes to an optical means arranged on the transfer head 30. A particularly preferred arrangement of the ends of these light conductors is an array in which these light conductor ends acting as light sources are arranged in 8 rows; this arrangement produces a distribution of the light sources which is optimal in terms of space and therefore produces an array of 64 light sources with a minimum area requirement. The optical means images the array of light sources on the data carrier 23, 23', especially on a thermal plate, in accordance with the intensity distribution of the laser diodes. In order that no so-called "banding" or an undesired strip pattern on the data carrier 23, 23' is produced as a result of differences in the intensity maxima of the laser diodes, the system according to the invention can be used to measure the maximum intensity of each laser diode and therefore also of each light source before or else during the data transfer, and on this basis the maximum intensities of all the light sources can be matched to one another. This measurement and matching can be carried out automatically and has the advantage that intensity fluctuations caused by individual ageing of the laser diodes can be corrected in good time.

The arrangement according to the invention (cf. FIG. 3) additionally permits one or more solid-state lasers (=rubidium laser) or gas lasers (=neon, YAG laser) to be used. The use of these lasers naturally includes the arrangement of specific light-conducting means such as mirrors and the like. This use is made possible by an appropriately solid and voluminous design of the transfer head 30.

Advantages of the transference of data according to the invention to data carriers or the image-setting of thermal plates include:

The advantages of the internal-drum concept (independent plate size, simple loading of the image-setter, possible automation of the plate feed) are combined with the advantages of the external-drum principle (image-setting spacing of a few millimetres, use of laser diodes), so that a small distance between the optical means and the plate can be implemented using the multi-beam technique, for example by means of arrays of light conductors interacting with laser diodes.

The newest generation of thermal plates can have images set in the internal-drum process.

A true binary system, without the so-called "dot growth during pre-press" permits the highly accurate transfer of data or reproduction.

All the operations can be carried out in daylight.

In the present application, the exact description of technical details, such as computer control of the image-setting system, the transfer of the data to rotatable transfer means (for example by means of light conductors), making electrical contact by means of wiping contacts, have been omitted in the interests of the brevity of the application. The solution of such detailed problems of course corresponds to the knowledge and ability of a person skilled in the art and entrusted with such a task.

What is claimed is:

1. System for transferring data to plate-like data carriers, the system comprising: a holder, shaped at least partly as an inner cylinder, to arrange the data carriers with the side provided to accept data facing the cylinder axis of the holder, and a transfer head which can rotate about this cylinder axis and has at least one transfer means, for transferring the data to the data carrier; the holder and the transfer head also being capable of moving relative to each other in the direction of the cylinder axis, and a distance (d) between at least one surface of the transfer head or the transfer means and the data carrier, during the transfer of data, being less than ¼ of the holder diameter; and wherein the transfer means is constantly rotating during the transfer of data and comprises an array of 24 to 256 light sources for transferring the data using a multi-beam technique, the array is equipped with one common optical means for imaging the array of light sources onto the data carrier the distance (d) is less than 1 cm and the transfer head or the transfer means is radially displaceable for the adjustment of the image-setting distance (d).

2. System according to claim 1, wherein the transfer head is arranged such that it can move in the direction of the cylinder axis of the holder.

3. System according to claim 1, wherein the holder is arranged such that it can move along its cylinder axis.

4. System according to claim 1, wherein that the array comprises 64 light sources.

5. System according to claim 4, wherein the 64 light sources are arranged in 8 rows.

6. System according to claim 1, wherein the transfer means comprise semiconductor lasers, especially laser diodes.

7. System according to claim 6, wherein all the lasers and all electrical power parts associated therewith are arranged on the transfer head and such that they can rotate about the cylinder axis of the holder.

8. A method of transferring data, using a system according to claim 1, comprising constantly rotating the transfer means relative to the data carrier, and, during the rotation, transferring the data to the data carrier using the multi-beam technique.

9. The method of transferring data according to claim 8, wherein an image is set on a printing plate.

10. The method of transferring data according to claim 8, wherein an image is set on a thermal plate.

11. The method of transferring data according to claim 8, further comprising individually measuring a maximum intensity of each light before or during the data transfer.

12. The method of transferring data according to claim 11, further comprising, in order to avoid banding, matching the maximum intensities of all the light sources to one another.

* * * * *